United States Patent
Mizobata et al.

(10) Patent No.: US 11,351,900 B2
(45) Date of Patent: Jun. 7, 2022

(54) VEHICLE ARMREST AND VEHICLE SEAT

(71) Applicants: TOYOTA JIDOSHA KABUSHIKI KAISHA, Aichi-ken (JP); TOYOTA BOSHOKU KABUSHIKI KAISHA, Aichi (JP)

(72) Inventors: Hiroshi Mizobata, Seto (JP); Hiroyuki Mita, Nagoya (JP)

(73) Assignees: TOYOTA JIDOSHA KABUSHIKI KAISHA, Aichi-ken (JP); TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/090,893

(22) Filed: Nov. 6, 2020

(65) Prior Publication Data

US 2021/0188140 A1    Jun. 24, 2021

(30) Foreign Application Priority Data

Dec. 24, 2019 (JP) .............................. JP2019-233236

(51) Int. Cl.
| | |
|---|---|
| *B60N 2/70* | (2006.01) |
| *B60N 2/75* | (2018.01) |
| *B60R 16/03* | (2006.01) |
| *B60R 11/02* | (2006.01) |
| *B60R 11/00* | (2006.01) |

(52) U.S. Cl.
CPC .......... *B60N 2/797* (2018.02); *B60R 11/0235* (2013.01); *B60R 16/03* (2013.01); *B60R 2011/0014* (2013.01)

(58) Field of Classification Search
CPC ....... B60N 2/797; B60N 2/79; B60R 11/0235; B60R 16/03; B60R 2011/0014
USPC .................................................... 297/188.14
See application file for complete search history.

(56) References Cited

U.S. PATENT DOCUMENTS

| | | | |
|---|---|---|---|
| 2020/0354063 A1* | 11/2020 | Satterfield .......... | B64D 11/0646 |
| 2021/0153656 A1* | 5/2021 | Hudiburg .............. | A47C 7/624 |

FOREIGN PATENT DOCUMENTS

| | | | |
|---|---|---|---|
| CN | 107009925 | * | 8/2017 |
| CN | 208539626 | * | 2/2019 |
| CN | 208813041 | * | 5/2019 |
| CN | 111731171 | * | 10/2020 |
| JP | 201875875 A | | 5/2018 |

(Continued)

*Primary Examiner* — Mark R Wendell
(74) *Attorney, Agent, or Firm* — Hauptman Ham, LLP (57) ABSTRACT

A vehicle armrest that is provided at a seat transverse direction end portion of a vehicle seat and that extends in a seat front-rear direction, the vehicle armrest including: a front-side supporting portion that is provided at a seat front-side end portion, and that is configured to support a wrist end portion of a forearm of a vehicle occupant; a rear-side supporting portion that is provided at a seat rear-side end portion, and that is configured to support an elbow end portion of the forearm; and a terminal accommodating portion that is provided between the front-side supporting portion and the rear-side supporting portion, a seat upper side of the terminal accommodating portion being open, and the terminal accommodating portion being positioned at a seat lower side of the forearm that is placed on the vehicle armrest, and the terminal accommodating portion being able to accommodate a portable terminal.

20 Claims, 5 Drawing Sheets

(56) References Cited

FOREIGN PATENT DOCUMENTS

| KR | 20200118769 | * | 10/2020 |
| KR | 20210065825 | * | 6/2021 |

* cited by examiner

VEHICLE ARMREST AND VEHICLE SEAT

CROSS-REFERENCE TO RELATED APPLICATION

This application is based on and claims priority under 35 USC 119 from Japanese Patent Application No. 2019-233236 filed on Dec. 24, 2019, the disclosure of which is incorporated by reference herein.

BACKGROUND

Technical Field

The present disclosure relates to a vehicle armrest and a vehicle seat.

Related Art

Japanese Patent Application Laid-Open (JP-A) No. 2018-075875 discloses a vehicle seat having a holder that accommodates therein a contactless power supply device that supplies electricity to a portable electronic equipment (a portable terminal). In the vehicle seat disclosed in JP-A No. 2018-075875, the holder is fixed to a front end portion of an armrest, and electricity is supplied to the portable terminal in a state in which the portable terminal is held in the holder.

In the above-described related art, because the edges of the holder project-out further upward than a supporting surface of the armrest, there is the possibility that a vehicle occupant whose forearm is placed on the armrest will feel that the forearm contacts a foreign body. Further, in the state in which the vehicle occupant has his/her forearm placed on the armrest, because his/her hand is placed at a location of the holder, the hand is always contacting the portable terminal. Therefore, there is room for improvement in holding a portable terminal in a state in which the portable terminal can be operated, while maintaining the function of the armrest for supporting a forearm of a vehicle occupant.

SUMMARY

In view of the above-described circumstances, an object of the present disclosure is to provide a vehicle armrest and a vehicle seat that can hold a portable terminal in a state in which a portable terminal can be operated, while maintaining the function of the armrest.

A vehicle armrest of a first aspect of the present disclosure is provided at a seat transverse direction end portion of a vehicle seat and extends in a seat front-rear direction. The vehicle armrest includes: a front-side supporting portion that is provided at a seat front-side end portion, and that is configured to support a wrist end portion of a forearm of a vehicle occupant; a rear-side supporting portion that is provided at a seat rear-side end portion, and that is configured to support an elbow end portion of the forearm of the vehicle occupant; and a terminal accommodating portion that is provided between the front-side supporting portion and the rear-side supporting portion, a seat upper side of the terminal accommodating portion being open, and, in a state in which the forearm of the vehicle occupant is supported by the front-side supporting portion and the rear-side supporting portion, the terminal accommodating portion being positioned at a seat lower side of the forearm, and the terminal accommodating portion being formed so as to be able to accommodate a portable terminal.

The vehicle armrest of the first aspect of the present disclosure is provided at the seat transverse direction end portion of a vehicle seat, and the vehicle armrest extends in the seat front-rear direction. The front-side supporting portion is provided at the seat front-side end portion of the vehicle armrest. The front-side supporting portion is configured to support the wrist end portion of the forearm of a vehicle occupant. The rear-side supporting portion is provided at the seat rear-side end portion of the vehicle armrest. The rear-side supporting portion is configured to support the elbow end portion of the forearm of the vehicle occupant. Due thereto, in a state in which a vehicle occupant has placed his/her arm on the vehicle armrest, the forearm can be supported well.

Further, the terminal accommodating portion, a seat upper side of the terminal accommodating portion being open and that can accommodate a portable terminal, is provided between the front-side supporting portion and the rear-side supporting portion. In a state in which the forearm of a vehicle occupant is supported by the front-side supporting portion and the rear-side supporting portion, the terminal accommodating portion is positioned at the seat lower side of the forearm. Therefore, even in a state in which a portable terminal is accommodated at the terminal accommodating portion, the vehicle occupant can maintain a comfortable posture with the forearm placed on the armrest. Namely, when the armrest is in use, the portable terminal does not disturb the comfortable posture of the vehicle occupant. Further, the portable terminal that is accommodated at the terminal accommodating portion can be operated merely by the vehicle occupant moving the forearm, which is placed on the armrest, toward the seat rear side.

In a vehicle armrest of a second aspect of the present disclosure, in the vehicle armrest of the first aspect, a wireless power supply device, which can supply electricity to the portable terminal in a non-contact manner, is provided at the terminal accommodating portion.

In the vehicle armrest of the second aspect of the present disclosure, the wireless power supply device is provided at the terminal accommodating portion. Due thereto, electricity is supplied from the wireless power supply device to the portable terminal in a state in which the portable terminal is accommodated at the terminal accommodating portion.

In a vehicle armrest of a third aspect of the present disclosure, in the vehicle armrest of the first aspect or the second aspect, a placement surface, on which a portable terminal is placed, of the terminal accommodating portion is inclined toward a seat lower side while heading from the front-side supporting portion toward the rear-side supporting portion.

In the vehicle armrest of the third aspect of the present disclosure, the placement surface, on which the portable terminal is placed, is inclined toward the seat lower side while heading from the front-side supporting portion toward the rear-side supporting portion. Due thereto, when the portable terminal is placed on the placement surface in a state in which the display screen of the portable terminal is face-up, the display screen is in a state of facing toward the seat rear side.

In a vehicle armrest of a fourth aspect of the present disclosure, in the vehicle armrest of the third aspect, the placement surface, on which a portable terminal is placed, of the terminal accommodating portion is configured to be inclined toward a seat lower side while heading from an outer side in a vehicle width direction of the placement surface toward an inner side in the vehicle width direction of the placement surface.

In the vehicle armrest of the fourth aspect of the present disclosure, the placement surface, on which the portable terminal is placed, is configured to be inclined toward the seat lower side while heading from the outer side in the vehicle width direction of the placement surface toward the inner side in the vehicle width direction of the placement surface. Due thereto, when the portable terminal is placed on the placement surface in a state in which the display screen of the portable terminal is face-up, the display screen is in a state of facing toward a central side of a vehicle seat.

In a vehicle armrest of a fifth aspect of the present disclosure, in the vehicle armrest of any of the first aspect through the fourth aspect, the terminal accommodating portion includes a terminal supporting portion, which, in a state in which a portable terminal is accommodated at the terminal accommodating portion, supports a portion of the portable terminal, the portion being further toward a seat rear side than a seat front-side end portion of the portable terminal, from a seat lower side, and a concave portion, which is provided at a seat front side of the terminal supporting portion and is positioned further toward a seat lower side than the terminal supporting portion.

In the vehicle armrest of the fifth aspect of the present disclosure, in a state in which the portable terminal is accommodated at the terminal accommodating portion, the portion of the portable terminal, the portion being further toward the seat rear side than the seat front-side end portion of the portable terminal, is supported from the seat lower side by the terminal supporting portion. Further, the concave portion is provided at the seat front side of the terminal supporting portion, and the concave portion is positioned further toward the seat lower side than the terminal supporting portion. Due thereto, due to a vehicle occupant inserting his/her fingers into the concave portion, the vehicle occupant can raise the seat front-side end portion of the portable terminal by lifting the reverse surface side of the portable terminal. Further, also when the seat front-side end portion of the portable terminal is pushed down toward a concave portion side, the seat rear-side end portion of the portable terminal can be raised, and the portable terminal can be grasped.

A vehicle seat of a sixth aspect of the present disclosure includes: a seat cushion that is configured to support buttocks and femoral regions of a vehicle occupant; a seatback that extends toward a seat upper side from a seat rear-side end portion of the seat cushion, and that is configured to support a back portion of a vehicle occupant; and the vehicle armrest of any one of the first aspect through the fifth aspect, which is provided at one end side or at both end sides in the seat transverse direction of the seat cushion.

The vehicle seat of the sixth aspect of the present disclosure has the seat cushion, which is configured to support the buttocks and the femoral regions of the vehicle occupant, and the seatback, which is configured to support the back portion of the vehicle occupant. The vehicle armrest of any one of the first aspect through the fifth aspect is provided at one end side or both end sides in the seat transverse direction of the seat cushion. Due thereto, a portable terminal can be accommodated at the terminal accommodating portion of the vehicle armrest, in a state in which a vehicle occupant is seated in the vehicle seat. Further, even in a state in which a portable terminal is accommodated at the terminal accommodating portion, the vehicle occupant can maintain a comfortable posture with the forearm placed on the armrest.

In a vehicle seat of a seventh aspect of the present disclosure, in the vehicle seat of the sixth aspect, the vehicle armrest is provided at least at an outer side in a vehicle transverse direction with respect to the seat cushion.

In the vehicle seat of the seventh aspect of the present disclosure, the vehicle armrest is provided at least at the outer side in the vehicle transverse direction of the seat cushion. Therefore, the portable terminal can be accommodated at the outer side in the vehicle transverse direction of the vehicle seat. Due thereto, the screen of the portable terminal is prevented from being seen by other vehicle occupants, as compared with a structure in which the portable terminal can only be accommodated at an inner side in the vehicle transverse direction of the vehicle seat.

As described above, in accordance with the vehicle armrest of the first aspect of the present disclosure, the portable terminal can be held in a state in which the portable terminal can be operated, while the function of the armrest for supporting a forearm of a vehicle occupant is maintained.

In accordance with the vehicle armrest of the second aspect of the present disclosure, the portable terminal can be charged easily without a special operation.

In accordance with the vehicle armrest of the third aspect and the fourth aspect of the present disclosure, in a state in which the portable terminal is accommodated at the terminal accommodating portion, the visibility of displayed contents that are displayed on the display screen of the portable terminal can be improved.

In accordance with the vehicle armrest of the fifth aspect of the present disclosure, the portable terminal that is accommodated at the terminal accommodating portion can be removed easily.

In accordance with the vehicle seat of the sixth aspect of the present disclosure, the portable terminal can be held in a state in which the portable terminal can be operated, while the function of the armrest for supporting a forearm of a vehicle occupant is maintained.

In accordance with the vehicle seat of the seventh aspect of the present disclosure, information displayed on the display of the portable terminal is prevented from being seen by other vehicle occupant.

BRIEF DESCRIPTION OF THE DRAWINGS

Exemplary embodiments of the present invention will be described in detail based on the following figures, wherein.

DETAILED DESCRIPTION

First Embodiment

A vehicle seat 12, to which a vehicle armrest 10 relating to a first embodiment is applied, is described with reference to the drawings. Note that arrow FR, arrow UP and arrow RH that are shown appropriately in the respective drawings indicate a seat forward direction, a seat upward direction, and a seat rightward direction of the vehicle seat 12, respectively. Hereinafter, when description is given by merely using front-rear, vertical and left-right directions, they refer to the front and the rear of the seat front-rear direction, the upper side and lower side in the seat vertical direction, and the left and the right of the seat transverse direction, unless otherwise specified.

Figure 1:
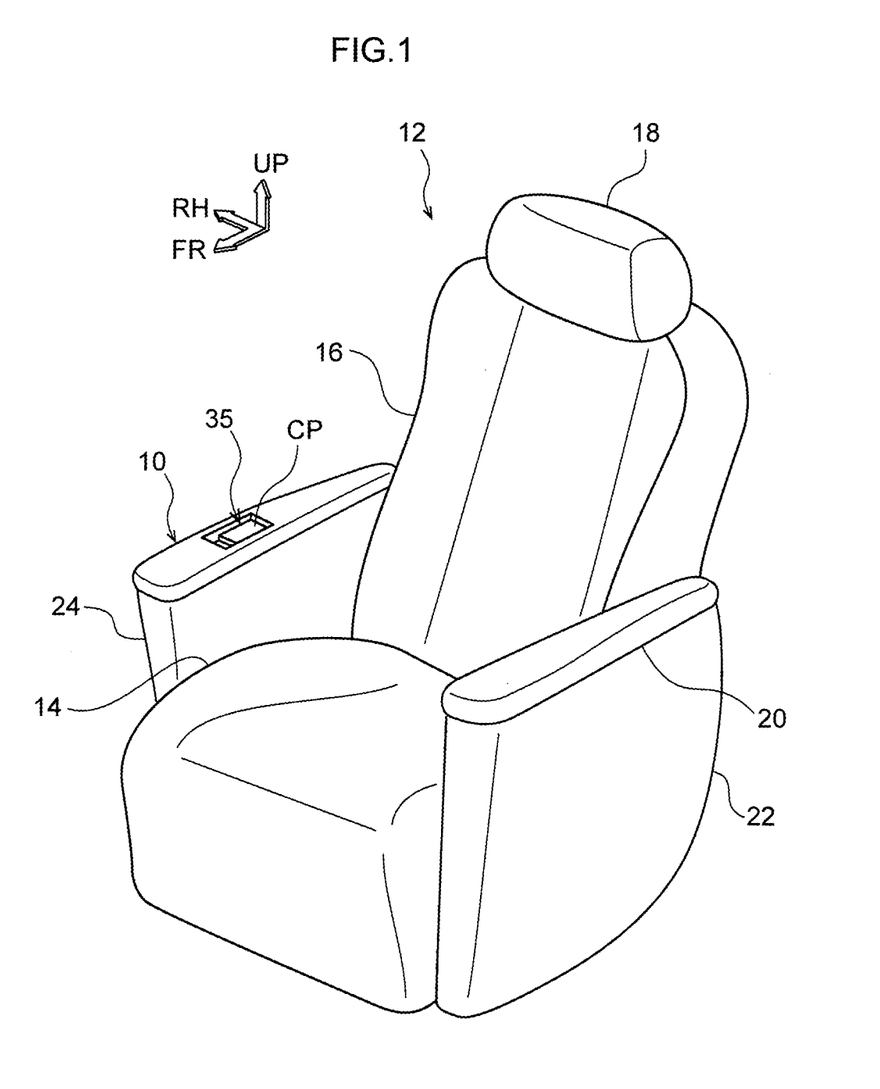
FIG. 1 is a perspective view that schematically shows a vehicle seat at which is provided a vehicle armrest relating to a first embodiment.

As shown in FIG. 1, the vehicle armrest 10 of the present embodiment is provided at a right side of the vehicle seat 12. Therefore, in the following description, the vehicle armrest 10 is appropriately called the "right-side armrest 10".

The vehicle seat 12 is mainly structured to include a seat cushion 14, a seatback 16, a headrest 18, a left-side armrest 20 and the right-side armrest 10. As an example, the vehicle seat 12 is installed further toward a vehicle right side than a transverse direction center of the vehicle. The front-rear direction of the vehicle seat 12 and a longitudinal direction of the vehicle coincide with one another, and a seat transverse direction of the vehicle seat 12 and a vehicle transverse direction coincide with one another. Therefore, the vehicle seat 12 structures the seat at the right side, and is disposed such that the vehicle occupant who is seated in the vehicle seat faces toward the vehicle front side.

The seat cushion 14 is structured so as to be able to support the femoral regions and the buttocks of the vehicle occupant from a lower side. The seatback 16 is connected to a rear-side end portion of the seat cushion 14.

The seatback 16 extends toward an upper side from a rear-side end portion of the seat cushion 14, and is structured so as to be able to support the back of the vehicle occupant. The seatback 16 can rotate in the front-rear direction with respect to the seat cushion 14. Concretely, an unillustrated reclining mechanism is provided at a portion where the seat cushion 14 and the seatback 16 are connected, and the seatback 16 can be reclined with respect to the seat cushion 14 by the reclining mechanism.

The headrest 18, which can support the head of the vehicle occupant from the rear side, is provided at an upper end portion of the seatback 16. The headrest 18 is, for example, mounted to unillustrated headrest stays that extend in the vertical direction, and is mounted to the seatback 16 via the headrest stays.

Here, a left-side wall portion 22 whose thickness direction is along the seat transverse direction is provided at a left side of the seat cushion 14 and the seatback 16. The left-side armrest 20 is provided at an upper end portion of the left-side wall portion 22. The left-side armrest 20 extends in the front-rear direction, and is structured such that the left forearm of the vehicle occupant who is seated in the vehicle seat 12 can be placed thereon. A design surface of the left-side armrest 20 is formed by a decorative member.

A right-side wall portion 24 whose thickness direction is along the seat transverse direction is provided at a right side of the seat cushion 14 and the seatback 16. The right-side armrest 10 is provided at an upper end portion of the right-side wall portion 24. The right-side armrest 10 extends in the front-rear direction, and is structured such that the right forearm of the vehicle occupant who is seated in the vehicle seat 12 can be placed thereon. Details of the right-side armrest 10 are described hereinafter.

Figure 4:
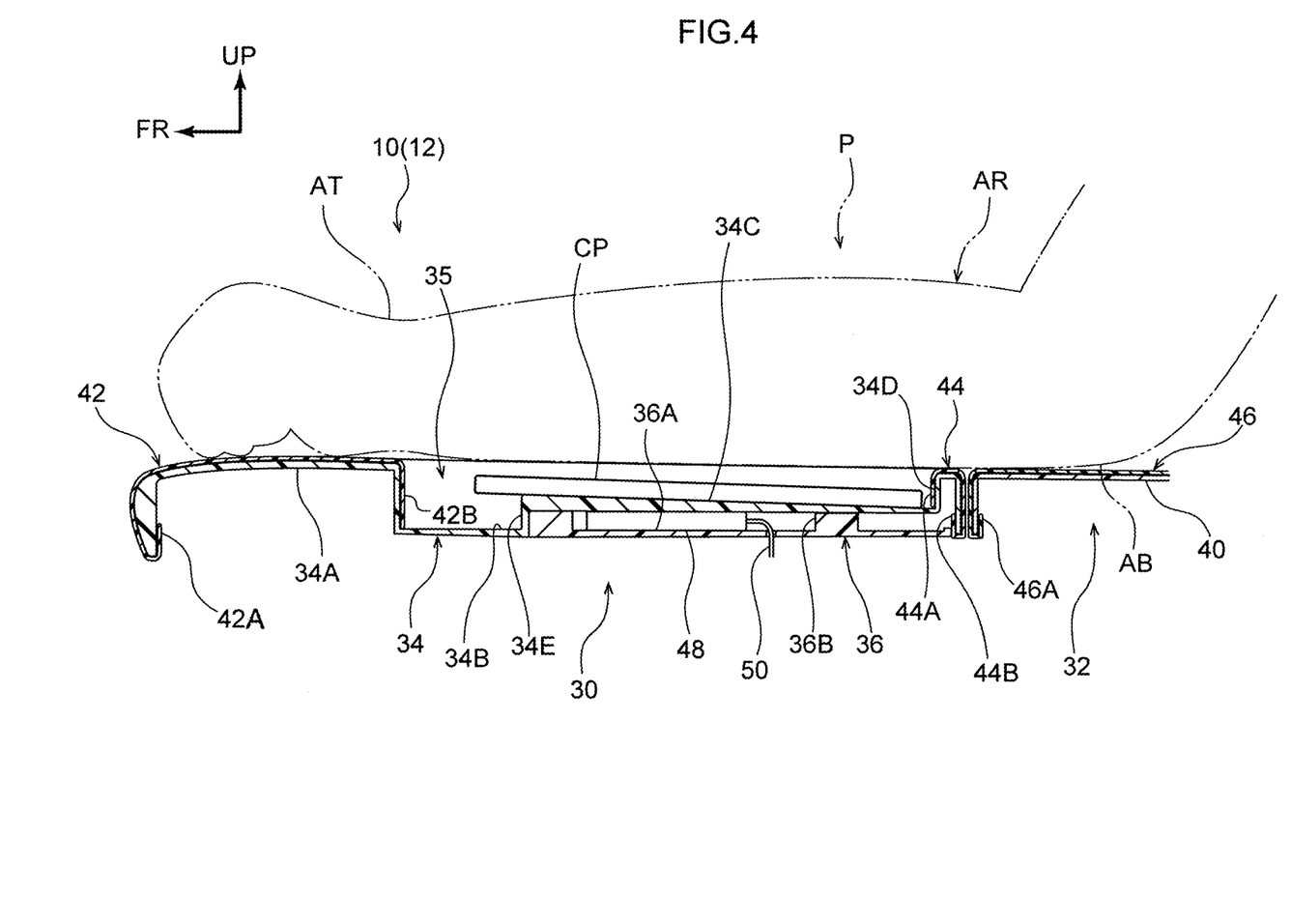
FIG. 4 is a cross-sectional view showing the state cut along line 4-4 of FIG. 2.

As shown in FIG. 4, the right-side armrest 10 is structured to include a front-side structural portion 30 and a rear-side structural portion 32. The front-side structural portion 30 is disposed at a front side of the right-side armrest 10, and is structured to include a front-side base member 34, a first decorative member 42, a second decorative member 44, and a power supply device supporting member 36.

The front-side base member 34 is formed of a material whose main component is resin. A front-side supporting portion 34A is provided at a front end portion of the front-side base member 34. The cross-section, as seen in the seat transverse direction, of the front-side supporting portion 34A is formed in a substantial U-shape that is flat and opens toward the seat lower side. An obverse-side surface of the front-side supporting portion 34A is covered by the first decorative member 42. Further, the front-side supporting portion 34A can support portion AT which is a wrist end portion of a forearm AR of a vehicle occupant P who is an adult male of a standard physique. Concretely, the hand portion extended from the wrist of the vehicle occupant P is supported.

The first decorative member 42 is formed in a shape that runs along an outer shape of the front-side supporting portion 34A. Concretely, a front end portion of the first decorative member 42 extends downward along a front surface of the front-side supporting portion 34A. A lower end portion of the front end portion of the first decorative member 42 is a folded-over portion 42A that is folded-over so as to lap a front end portion of the front-side supporting portion 34A. Further, a rear end portion 42B of the first decorative member 42 extends downward along a rear surface of the front-side supporting portion 34A. The design surface of the front end portion of the right-side armrest 10 is formed by the first decorative member 42 (see FIG. 2).

A rear-side supporting portion 34D is provided at a rear end portion of the front-side base member 34. The cross-section, as seen from the seat transverse direction, of the rear-side supporting portion 34D is formed in a substantial J-shape that opens toward the seat lower side. An obverse-side surface of the rear-side supporting portion 34D is covered by the second decorative member 44. The rear-side supporting portion 34D can support portion AB which is an elbow end portion of the forearm AR of the vehicle occupant P. Concretely, the hand portion extended from the elbow of the vehicle occupant P is supported.

The second decorative member 44 is formed in a shape that runs along an outer shape of the rear-side supporting portion 34D. Concretely, a front end portion 44A of the second decorative member 44 extends downward along a front surface of the rear-side supporting portion 34D. A rear end portion of the second decorative member 44 extends downward along a rear surface of the rear-side supporting portion 34D. A lower end portion of the rear-side portion of the second decorative member 44 is a folded-over portion 44B that is folded-over so as to lap a rear end portion of the rear-side supporting portion 34D. Further, the design surface of the rear end portion of the right-side armrest 10 is formed by the second decorative member 44 (see FIG. 2).

Figure 2:
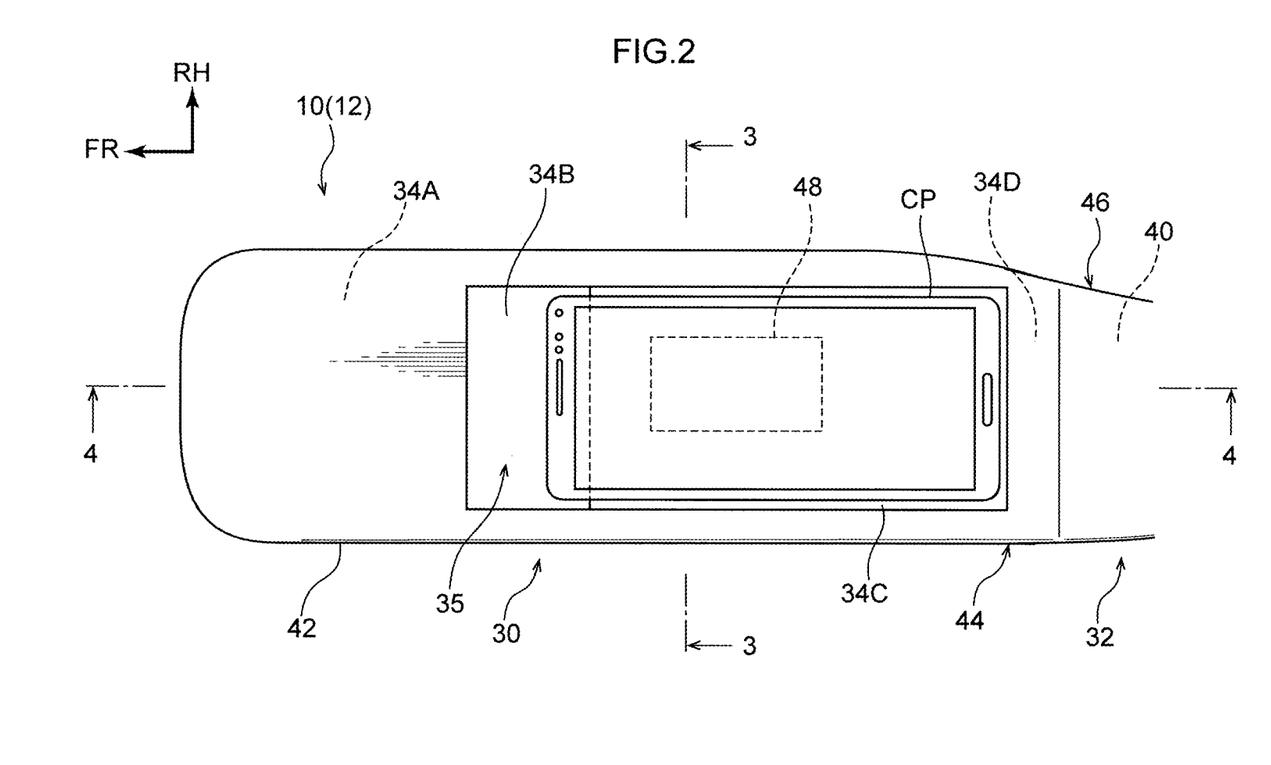
FIG. 2 is a plan view of the vehicle armrest relating to the first embodiment, and shows a state in which a portable terminal is accommodated at the armrest.

As shown in FIG. 2 and FIG. 4, a terminal accommodating portion 35 is provided between the front-side supporting portion 34A and the rear-side supporting portion 34D at the front-side base member 34. An upper side of the terminal accommodating portion 35 is open, and the terminal accommodating portion 35 is structured to include a terminal supporting portion 34C and a concave portion 34B.

The terminal supporting portion 34C is formed so as to be contiguous to a front side of the rear-side supporting portion 34D. Concretely, the terminal supporting portion 34C is the portion that extends toward a front side from the lower end at the front end portion of the rear-side supporting portion 34D, and is positioned further toward the lower side than the upper end of the front-side supporting portion 34A and the upper end of the rear-side supporting portion 34D. Namely, the terminal supporting portion 34C is positioned at the lower side of the forearm AR, in the state in which the forearm AR of the vehicle occupant P is supported by the front-side supporting portion 34A and the rear-side supporting portion 34D.

Further, an upper surface at the terminal supporting portion 34C is a placement surface on which a portable terminal CP is placed. The placement surface is inclined toward the lower side while heading from the front-side supporting portion 34A toward the rear-side supporting portion 34D. In other words, the placement surface of the terminal supporting portion 34C is inclined toward the upper side while heading from the rear-side supporting portion 34D toward the front-side supporting portion 34A. The front end portion of the terminal supporting portion 34C is set to a height at which the portable terminal CP does not contact the forearm AR of the vehicle occupant P, even in a case in which the portable terminal CP is placed on the terminal supporting portion 34C. Note that a sheet for preventing slippage, or the like, may be affixed to the placement surface of the terminal supporting portion 34C so that the portable terminal CP does not move.

Moreover, the terminal supporting portion 34C is formed such that a front-rear direction length thereof is shorter than a front-rear direction length of the portable terminal CP. Therefore, in the state in which the portable terminal CP is placed on the placement surface of the terminal supporting portion 34C, only a portion, which is further toward a rear side than a front-side end portion of the portable terminal CP, is supported by the terminal supporting portion 34C from the seat lower side.

The concave portion 34B is formed via a step 34E at a front side of the terminal supporting portion 34C. Due to the step 34E, the concave portion 34B is positioned further toward the lower side than the terminal supporting portion 34C. The terminal supporting portion 34C and the front-side supporting portion 34A are connected in the front-rear direction by the concave portion 34B. Namely, a front end of the concave portion 34B is connected to the lower end of the rear end portion of the front-side supporting portion 34A.

Here, the front-rear direction length of the terminal supporting portion 34C is shorter than the front-rear direction length of the portable terminal CP. Therefore, in the state in which the portable terminal CP is placed on the terminal supporting portion 34C, the front side end portion of the portable terminal CP overlaps the concave portion 34B as seen in plan view.

In the present embodiment, as an example, a front-rear direction length of the terminal accommodating portion 35 including the terminal supporting portion 34C and the concave portion 34B is formed to be sufficiently longer than the front-rear direction length of the portable terminal CP. Therefore, the terminal accommodating portion 35 is designed such that, in the state in which the portable terminal CP is placed on the terminal supporting portion 34C, a gap is formed between the portable terminal CP and the front-side supporting portion 34A, and the fingers of the vehicle occupant P can be inserted into the gap.

Figure 3:
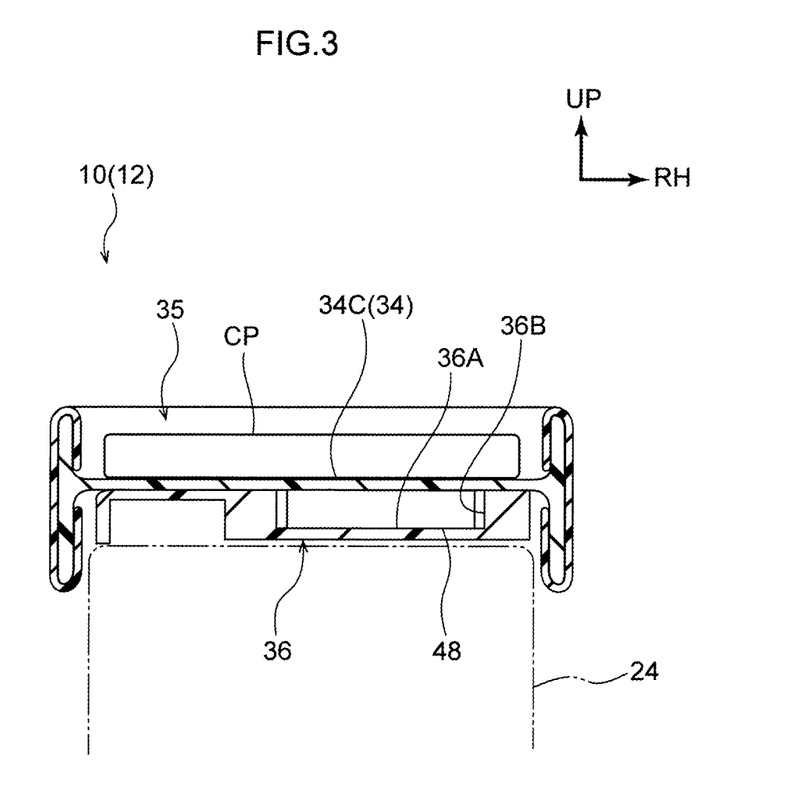
FIG. 3 is an enlarged sectional view showing the state cut along line 3-3 of FIG. 2.

As shown in FIG. 3 and FIG. 4, a power supply device supporting member 36 is provided at the terminal accommodating portion 35, beneath the terminal supporting portion 34C. The power supply device supporting member 36 is formed substantially in the shape of a box whose upper side is an opening portion. A wireless power supply device 48 is supported at a bottom portion 36A of the power supply device supporting member 36. Further, a peripheral wall portion 36B that is shaped as a rectangular frame is provided upright at peripheral end portions of the bottom portion 36A.

An upper end of the peripheral wall portion 36B is slightly higher than an upper surface of the wireless power supply device 48 that is supported by the bottom portion 36A.

The upper end of the peripheral wall portion 36B of the power supply device supporting member 36 is fixed to a lower surface of the terminal supporting portion 34C. Therefore, a space is formed between the power supply device supporting member 36 and the terminal supporting portion 34C, and the wireless power supply device 48 is accommodated in the space. One end of a harness 50 is connected to the wireless power supply device 48. Another end of the harness 50 is connected to an unillustrated electric power supply source. Note that a lower surface of the power supply device supporting member 36 is fixed to the right-side wall portion 24.

The wireless power supply device 48 is supported by the power supply device supporting member 36, and, is an electromagnetic induction power supply device. An unillustrated coil for receiving power is provided at an interior of the portable terminal CP. A structure is utilized in which current flows to the coil due to the magnetic field that is generated from the wireless power supply device 48. Therefore, the wireless power supply device 48 is disposed so as to coincide with the position of the coil that is built into the portable terminal CP, in the state in which the portable terminal CP is placed on the terminal supporting portion 34C. Note that a power supply device of another type may be used, provided that it is a structure by which electricity can be supplied to the portable terminal CP in a non-contact manner.

The rear-side structural portion 32 is provided at the rear side of the front-side structural portion 30 that is structured as described above. The rear-side structural portion 32 is positioned at a rear-side part of the right-side armrest 10, and is structured to include a rear-side supporting portion 40 and a third decorative member 46.

The rear-side supporting portion 40 is formed of resin. A cross-section, as seen in the seat transverse direction, of the rear-side supporting portion 40 is formed in a substantial U-shape that is flat and that opens toward the lower side. Note that, in FIG. 4, only a front side of the rear-side supporting portion 40 is illustrated, and illustration of a rear side thereof is omitted.

An obverse-side surface of the rear-side supporting portion 40 is covered by the third decorative member 46. Further, the rear-side supporting portion 40 can, together with the rear-side supporting portion 34D of the front-side structural portion 30, support a portion AB which is elbow end portion of the forearm AR of the vehicle occupant P.

The third decorative member 46 is formed in a shape that runs along an outer shape of the rear-side supporting portion 40. Concretely, a front end portion of the third decorative member 46 extends downward along a front surface of the rear-side supporting portion 40. A lower end portion of the front end portion of the third decorative member 46 is a folded-over portion 46A that is folded-over so as to lap a front end portion of the rear-side supporting portion 40. A portion of the design surface of the rear end portion of the right-side armrest 10 is formed by the third decorative member 46 (see FIG. 2).

(Operation)

Operation of the Present Embodiment is Described Next.

At the vehicle armrest 10 relating to the present embodiment, the front-side supporting portion 34A is structured so as to be able to support the wrist end portion of the forearm AR of the vehicle occupant P, and the rear-side supporting portion 34D of the front-side structural portion 30 and the rear-side supporting portion 40 of the rear-side structural portion 32 are structured so as to be able to support the elbow end portion of the forearm AR of the vehicle occupant P. Due thereto, in the state in which the vehicle occupant P has placed his/her forearm AR on the vehicle armrest 10, both the wrist end portion and the elbow end portion of the forearm AR can be supported well.

Further, the terminal accommodating portion 35 is provided between the front-side supporting portion 34A and the rear-side supporting portion 34D. This terminal accommodating portion 35 is positioned at the lower side of the forearm AR, in the state in which the forearm AR of the vehicle occupant P is supported by the front-side supporting portion 34A, the rear-side supporting portion 34D, and the rear-side supporting portion 40. Therefore, even in a state in which the portable terminal CP is accommodated at the terminal accommodating portion 35, the vehicle occupant P can maintain a comfortable posture with the forearm AR placed on the right-side armrest 10. Namely, the portable terminal CP does not disturb the comfortable posture of the vehicle occupant P. Further, the portable terminal CP that is accommodated at the terminal accommodating portion 35 can be operated merely by the vehicle occupant P moving the forearm AR, which has been placed on the right-side armrest 10, toward the rear side. The portable terminal CP can be maintained in an operatable state, while the right-side armrest 10 supports the forearm AR.

Further, in the present embodiment, the wireless power supply device 48 is provided at the terminal accommodating portion 35. Due thereto, electricity is supplied from the wireless power supply device 48 to the portable terminal CP in the state in which the portable terminal CP is accommodated at the terminal accommodating portion 35. Namely, the portable terminal CP can be charged easily without a special operation.

Moreover, the placement surface on which the portable terminal CP is placed is inclined toward the lower side while heading from the front-side supporting portion 34A toward the rear-side supporting portion 34D. Due thereto, when the portable terminal CP is placed on the placement surface in a state in which the display screen of the portable terminal CP is face-up, the display screen is in a state of facing toward the rear side. The visibility of displayed contents that are displayed on the display screen can be improved, in the state in which the portable terminal CP is accommodated at the terminal accommodating portion 35. Namely, in a case in which the placement surface of the portable terminal CP is horizontal, it may be difficult for the vehicle occupant P who is seated in the vehicle seat 12 to see the display screen, and it may be difficult for the vehicle occupant P to operate the portable terminal CP in a comfortable posture. In contrast, in the present embodiment, because the portable terminal CP is supported by the terminal supporting portion 34C in a state of facing toward the rear side, the vehicle occupant P can easily see the display screen of the portable terminal CP in the state in which the vehicle occupant P is seated in the vehicle seat 12.

Still further, in the state in which the portable terminal CP is accommodated at the terminal accommodating portion 35, the portion of the portable terminal CP, which portion is further toward the rear side than the front side end portion, is supported from the lower side by the terminal supporting portion 34C. Further, the concave portion 34B is provided at the front side of the terminal supporting portion 34C, and the concave portion 34B is positioned further toward the lower side than the terminal supporting portion 34C. Due thereto, if the vehicle occupant P can insert his/her fingers into the concave portion 34B, the vehicle occupant P can lift the front-side end portion of the portable terminal CP up by raising a reverse surface side thereof. Namely, in the state of FIG. 4, due to the vehicle occupant P moving the forearm AR rearward and inserting the fingertips into the gap between the portable terminal CP and the front-side supporting portion 34A, the vehicle occupant P can grasp and lift-up the front end portion of the portable terminal CP.

Further, even in a case in which the vehicle occupant cannot insert his/her fingers into the gap between the portable terminal CP and the front-side supporting portion 34A, by pushing a front end portion of the portable terminal CP down toward a concave portion 34B side, a rear end side of the portable terminal CP rises-up with the front end portion of the terminal supporting portion 34C being a fulcrum. Due thereto, the vehicle occupant P can grasp the portable terminal CP.

Further, as shown in FIG. 1, because the right-side armrest 10 is provided at least at an outer side in the vehicle transverse direction of the seat cushion 14, the portable terminal CP can be accommodated at the vehicle transverse direction outer side of the vehicle seat 12. Due thereto, as compared with a structure in which the portable terminal CP can be accommodated only at an inner side in the vehicle transverse direction of the vehicle seat 12, it is difficult for other vehicle occupants to see the screen of the portable terminal CP. Namely, private information displayed on the screen can be prevented from being seen by others.

Second Embodiment

A vehicle armrest 60 relating to a second embodiment is described with reference to FIG. 5. Note that, in the present embodiment, structures are similar to those of the first embodiment, except for the terminal supporting portion 34C of the front-side base member 34, and description is omitted as appropriate.

In the same way as in the first embodiment, the vehicle armrest 60 is provided at the right side of the vehicle seat 12. Therefore, in the following description, the vehicle armrest 60 is appropriately called the "right-side armrest 60".

Figure 5:
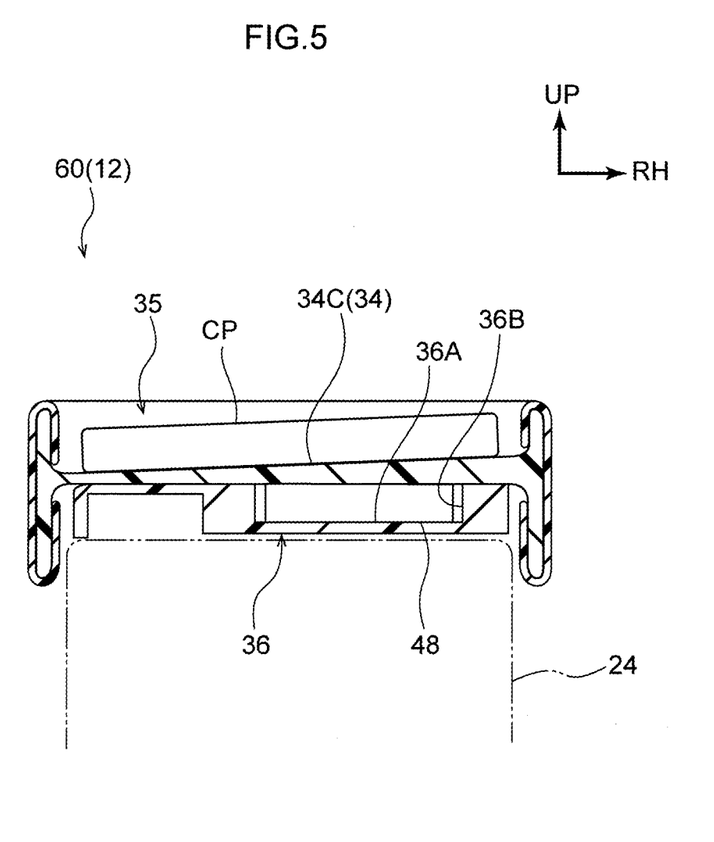
FIG. 5 is a cross-sectional view that corresponds to FIG. 3 and shows a vehicle armrest relating to a second embodiment.

As shown in FIG. 5, the cross-section, as seen from the rear side, of the terminal supporting portion 34C, which structures the front-side base member 34 of the right-side armrest 60, is inclined toward a lower side while heading from a right side (a seat transverse direction outer side) toward a left side (a seat transverse direction inner side). Further, a right side end portion of the terminal supporting portion 34C is set to a height that is such that the portable terminal CP does not project-out further upward than the terminal accommodating portion 35 in the state in which the portable terminal CP is placed on the terminal supporting portion 34C.

Moreover, in the same way as in the first embodiment, a cross-section, as seen from the seat transverse direction, of the terminal supporting portion 34C is inclined toward the seat lower side while heading from the front-side supporting portion 34A toward the rear-side supporting portion 34D (see FIG. 4). Therefore, in the state of being placed on the terminal supporting portion 34C, the portable terminal CP is in a state of facing toward the rear side and the seat transverse direction inner side.

(Operation)

Operation of the Present Embodiment is Described Next.

At the vehicle armrest 60 as described above, the portable terminal CP is supported by the terminal supporting portion 34C in a state of facing toward the rear side and the seat transverse direction inner side. The face of the vehicle occupant P when the vehicle occupant P is seated in the vehicle seat 12 is positioned at the rear side and an inner side in the seat transverse direction with respect to the portable terminal CP that is placed on the terminal supporting portion 34C. Due thereto, it is easier for the vehicle occupant P to see the display screen of the portable terminal CP, as compared with the first embodiment. Other functions are the same as those of the first embodiment.

The vehicle armrests 10, 60 and the vehicle seat 12 relating to the first embodiment and the second embodiment have been described above. However, the present disclosure can, of course, be implemented in various forms within a scope of the present disclosure. For example, as shown in FIG. 1, the vehicle armrest 10 is provided only at the right side in the above-described embodiments, but the present disclosure is not limited to this. Namely, an armrest that is similar to the vehicle armrest 10 may be provided at the left side as well.

Further, in the above-described embodiments, as shown in FIG. 4, a gap having a size of an extent such that the fingers of the vehicle occupant can enter therein, is provided between the front-side supporting portion 34A and the portable terminal CP that is placed on the terminal supporting portion 34C. However, the present disclosure is not limited to this. For example, the gap between the front-side supporting portion 34A and the portable terminal CP may be made to be small to the extent that fingers cannot be inserted therein. In this case, the portable terminal CP can be prevented from moving greatly toward the front side and the rear side even if vibrations from the road surface or the engine or the like are inputted to the portable terminal CP while the vehicle is traveling. Note that, at the time of taking the portable terminal CP out of the terminal accommodating portion 35, by pushing the front end portion of the portable terminal CP down toward the concave portion 34B side, the rear end side of the portable terminal CP rises up, and the portable terminal CP can be removed.

Moreover, although the portable terminal CP is accommodated directly in the terminal accommodating portion 35 in the above-described embodiments, the present disclosure is not limited to this. For example, an attachment that corresponds to the size of the portable terminal CP may be prepared in advance, and the portable terminal CP may be accommodated in the terminal accommodating portion 35 via this attachment. By accommodating the portable terminal CP in the terminal accommodating portion 35 via the attachment, portable terminals of different sizes can be supported well by the terminal supporting portion 34C. For example, in a case in which a portable terminal, whose length is shorter than the portable terminal CP, is accommodated at the terminal accommodating portion 35, if a front end portion of the portable terminal that is placed on the terminal supporting portion 34C does not overlap the concave portion 34B, an unillustrated attachment is attached to the terminal accommodating portion 35, and the attachment is made to overlap the rear end side of the terminal supporting portion 34C. Due thereto, the portable terminal can be placed so as to be offset toward the front side, and can be placed in a state in which a front end portion thereof is projected toward a concave portion 34B side.

Still further, in the above-described embodiments, the design surfaces of the vehicle armrests 10, 60 are formed by the first decorative member 42, the second decorative member 44 and the third decorative member 46, but the present disclosure is not limited to this. For example, the design surfaces of the vehicle armrests 10, 60 may be formed by the front-side supporting portion 34A, the rear-side supporting portion 34D and the rear-side supporting portion 40, without providing decorative members.

Further, in the above-described embodiments, as shown in FIG. 1, the four sides of the terminal accommodating portion 35 are surrounded by wall portions. However, the present disclosure is not limited to this. For example, parts of the wall portions at the left and the right of the terminal accommodating portion 35 may be cut-out. In this case, by cutting-out both side wall portions in the seat transverse direction of the concave portion 34B in FIG. 4, the portable terminal CP can be grasped by the vehicle occupant P inserting fingers in from the left and the right of the terminal accommodating portion 35.

Moreover, in the above-described embodiments, when the terminal accommodating portion 35 is not being used, a cover may be attached to the terminal accommodating portion 35, and the terminal accommodating portion 35 may be closed. If the terminal accommodating portion 35 is closed by a cover, the forearm AR can be supported by a portion that is between the front-side supporting portion 34A and the rear-side supporting portion 34D.

Still further, in the above-described embodiments, the vehicle seat 12 is disposed such that the front-rear direction of the vehicle seat 12 and the longitudinal direction of the vehicle coincide with one another, and such that the transverse direction of the vehicle seat 12 and the vehicle transverse direction coincide with one another. However, the present disclosure is not limited to this. For example, the front and rear of the vehicle seat 12 may be reversed, and the vehicle occupant who is seated in the vehicle seat 12 may face toward the vehicle rear side. In this case, the vehicle armrests 10, 60 are provided at the seat left side which is an outer side in the vehicle transverse direction with respect to the seat cushion 14 such that the display of the portable terminal CP) is prevented from being seen by other vehicle occupants.

What is claimed is:

1. A vehicle armrest that is provided at a seat transverse direction end portion of a vehicle seat and that extends in a seat front-rear direction, the vehicle armrest comprising:
   a front-side supporting portion that is provided at a seat front-side end portion, and that is configured to support a wrist end portion of a forearm of a vehicle occupant;
   a rear-side supporting portion that is provided at a seat rear-side end portion, and that is configured to support an elbow end portion of the forearm of the vehicle occupant; and
   a terminal accommodating portion that is provided between the front-side supporting portion and the rear-side supporting portion, a seat upper side of the terminal accommodating portion being open, and, in a state in which the forearm of the vehicle occupant is supported by the front-side supporting portion and the rear-side supporting portion, the terminal accommodating portion being positioned at a seat lower side of the forearm, and the terminal accommodating portion being formed so as to be able to accommodate a portable terminal wherein
   a placement surface, on which a portable terminal is placed, of the terminal accommodating portion is inclined toward a seat lower side along an entirety of the placement surface from the front-side supporting portion toward the rear-side supporting portion.

2. The vehicle armrest of claim 1, wherein a wireless power supply device, which is configured to supply electricity to the portable terminal in a non-contact manner, is provided at the terminal accommodating portion.

3. The vehicle armrest of claim 2, wherein the terminal accommodating portion includes a terminal supporting portion, which, in a state in which a portable terminal is accommodated at the terminal accommodating portion, supports a portion of the portable terminal, the portion being further toward a seat rear side than a seat front-side end portion of the portable terminal, from a seat lower side, and a concave portion, which is provided at a seat front side of the terminal supporting portion and is positioned further toward the seat lower side than the terminal supporting portion.

4. The vehicle armrest of claim 1, wherein the terminal accommodating portion includes a terminal supporting portion, which, in a state in which a portable terminal is accommodated at the terminal accommodating portion, supports a portion of the portable terminal, the portion being farther toward a seat rear side than a seat front-side end portion of the portable terminal, from a seat lower side, and a concave portion, which is provided at a seat front side of the terminal supporting portion and is positioned farther toward the seat lower side than the terminal supporting portion.

5. The vehicle armrest of claim 1, wherein a slope of the incline is constant.

6. A vehicle seat comprising:
a seat cushion that is configured to support buttocks and femoral regions of a vehicle occupant;
a seatback that extends toward a seat upper side from a seat rear-side end portion of the seat cushion, and that is configured to support a back portion of a vehicle occupant; and
the vehicle armrest of claim 1, which is provided at one end side or at both end sides in the seat transverse direction of the seat cushion.

7. The vehicle seat of claim 6, wherein the vehicle armrest is provided at least at an outer side in a vehicle transverse direction with respect to the seat cushion.

8. A vehicle armrest that is provided at a seat transverse direction end portion of a vehicle seat and that extends in a seat front-rear direction, the vehicle armrest comprising:
a front-side supporting portion that is provided at a seat front-side end portion, and that is configured to support a wrist end portion of a forearm of a vehicle occupant;
a rear-side supporting portion that is provided at a seat rear-side end portion, and that is configured to support an elbow end portion of the forearm of the vehicle occupant; and
a terminal accommodating portion that is provided between the front-side supporting portion and the rear-side supporting portion, a seat upper side of the terminal accommodating portion being open, and, in a state in which the forearm of the vehicle occupant is supported by the front-side supporting portion and the rear-side supporting portion, the terminal accommodating portion being positioned at a seat lower side of the forearm, and the terminal accommodating portion being formed so as to be able to accommodate a portable terminal, wherein
a placement surface, on which a portable terminal is placed, of the terminal accommodating portion is configured to be inclined toward a seat lower side along an entirety of the placement surface from an outer side in a vehicle width direction of the placement surface toward an inner side in the vehicle width direction of the placement surface.

9. The vehicle armrest of claim 8, wherein a placement surface, on which a portable terminal is placed, of the terminal accommodating portion is inclined toward a seat lower side while heading from the front-side supporting portion toward the rear-side supporting portion.

10. The vehicle armrest of claim 9, wherein the placement surface, on which a portable terminal is placed, of the terminal accommodating portion is configured to be inclined toward a seat lower side while heading from an outer side in a vehicle width direction of the placement surface toward an inner side in the vehicle width direction of the placement surface.

11. The vehicle armrest of claim 10, wherein the terminal accommodating portion includes a terminal supporting portion, which, in a state in which a portable terminal is accommodated at the terminal accommodating portion, supports a portion of the portable terminal, the portion being farther toward a seat rear side than a seat front-side end portion of the portable terminal, from a seat lower side, and a concave portion, which is provided at a seat front side of the terminal supporting portion and is positioned farther toward the seat lower side than the terminal supporting portion.

12. The vehicle armrest of claim 9, wherein the terminal accommodating portion includes a terminal supporting portion, which, in a state in which a portable terminal is accommodated at the terminal accommodating portion, supports a portion of the portable terminal, the portion being farther toward a seat rear side than a seat front-side end portion of the portable terminal, from a seat lower side, and a concave portion, which is provided at a seat front side of the terminal supporting portion and is positioned farther toward the seat lower side than the terminal supporting portion.

13. The vehicle armrest of claim 8, wherein the incline is constant.

14. The vehicle armrest of claim 8, wherein the terminal accommodating portion includes a terminal supporting portion, which, in a state in which a portable terminal is accommodated at the terminal accommodating portion, supports a portion of the portable terminal, the portion being farther toward a seat rear side than a seat front-side end portion of the portable terminal, from a seat lower side, and a concave portion, which is provided at a seat front side of the terminal supporting portion and is positioned farther toward the seat lower side than the terminal supporting portion.

15. The vehicle armrest of claim 8, wherein a wireless power supply device, which is configured to supply electricity to the portable terminal in a non-contact manner, is provided at the terminal accommodating portion.

16. The vehicle armrest of claim 15, wherein the terminal accommodating portion includes a terminal supporting portion, which, in a state in which a portable terminal is accommodated at the terminal accommodating portion, supports a portion of the portable terminal, the portion being further toward a seat rear side than a seat front-side end portion of the portable terminal, from a seat lower side, and a concave portion, which is provided at a seat front side of the terminal supporting portion and is positioned further toward the seat lower side than the terminal supporting portion.

17. The vehicle armrest of claim 8, wherein the terminal accommodating portion includes a terminal supporting portion, which, in a state in which a portable terminal is accommodated at the terminal accommodating portion, supports a portion of the portable terminal, the portion being farther toward a seat rear side than a seat front-side end portion of the portable terminal, from a seat lower side, and a concave portion, which is provided at a seat front side of the terminal supporting portion and is positioned farther toward the seat lower side than the terminal supporting portion.

18. The vehicle armrest of claim 17, wherein a bottommost surface of the concave portion is farther toward the seat lower side than a bottommost surface of the terminal accommodating portion.

19. A vehicle seat comprising:
- a seat cushion that is configured to support buttocks and femoral regions of a vehicle occupant;
- a seatback that extends toward a seat upper side from a seat rear-side end portion of the seat cushion, and that is configured to support a back portion of a vehicle occupant; and
- the vehicle armrest of claim 8, which is provided at one end side or at both end sides in the seat transverse direction of the seat cushion.

20. The vehicle seat of claim 19, wherein the vehicle armrest is provided at least at an outer side in a vehicle transverse direction with respect to the seat cushion.

\* \* \* \* \*